United States Patent
Chen et al.

(10) Patent No.: US 11,614,566 B2
(45) Date of Patent: Mar. 28, 2023

(54) ANTI-REFLECTIVE FILM AND POLARIZER COMPRISING THE SAME

(71) Applicant: BenQ Materials Corporation, Taoyuan (TW)

(72) Inventors: Ching-Huang Chen, Taoyuan (TW); Kuo-Hsuan Yu, Taoyuan (TW)

(73) Assignee: BenQ Materials Corporation, Taoyuan (TW)

( * ) Notice: Subject to any disclaimer, the term of this patent is extended or adjusted under 35 U.S.C. 154(b) by 395 days.

(21) Appl. No.: 16/920,480

(22) Filed: Jul. 3, 2020

(65) Prior Publication Data

US 2021/0263193 A1  Aug. 26, 2021

(30) Foreign Application Priority Data

Feb. 21, 2020 (TW) ................................. 109105639

(51) Int. Cl.
*G02B 1/111* (2015.01)
*G02B 5/30* (2006.01)
*G02B 1/14* (2015.01)

(52) U.S. Cl.
CPC ............... *G02B 1/111* (2013.01); *G02B 1/14* (2015.01); *G02B 5/3025* (2013.01)

(58) Field of Classification Search
CPC ...... G02B 1/00–1/18; G02B 5/00–5/32; C08G 77/46
See application file for complete search history.

(56) References Cited

U.S. PATENT DOCUMENTS

| | | | | |
|---|---|---|---|---|
| 6,846,568 | B2 * | 1/2005 | Yamaya | C08J 7/044 428/689 |
| 8,022,161 | B2 * | 9/2011 | Yamane | C08L 71/02 528/25 |
| 2010/0020398 | A1 * | 1/2010 | Horio | G02F 1/133528 359/488.01 |
| 2018/0265710 | A1 * | 9/2018 | Byun | G03F 7/027 |
| 2019/0049639 | A1 * | 2/2019 | Kanda | G02F 1/133606 |
| 2020/0041695 | A1 * | 2/2020 | Chen | C08G 77/24 |

FOREIGN PATENT DOCUMENTS

| | | |
|---|---|---|
| CN | 102031030 A | 4/2011 |
| CN | 104312229 A | 1/2015 |
| CN | 109337106 A | 2/2019 |
| TW | 202007732 A | 2/2020 |
| WO | 2017074039 A1 | 4/2017 |

OTHER PUBLICATIONS

"IRGACURE 127". Ciba Specialty Chemicals, (2004); pp. 1-4.*

* cited by examiner

*Primary Examiner* — Prashant J Khatri

(57) ABSTRACT

The invention disclosed an anti-reflective film. The anti-reflective film comprises a substrate, a hard coating layer disposed on the substrate and a low refractive layer disposed on the hard coating layer. The low refractivity layer comprises a fluorine-containing acrylate-modified polysiloxane resin, a plurality of hollow silica nanoparticles, an initiator and a leveling agent comprising a perfluoropolyether group-containing (meth)acrylic-modified organosilicone compound. The reflectivity of the anti-reflective film of the anti-reflective film is less than 1.1%, and the water contact angle thereof is ranging between 90° and 125°.

13 Claims, No Drawings

ANTI-REFLECTIVE FILM AND POLARIZER COMPRISING THE SAME

CROSS-REFERENCE TO RELATED APPLICATION

This application claims the priority benefit of Taiwanese Application Serial Number 109105639, filed Feb. 21, 2020 which is incorporated herein by reference.

TECHNICAL FILED

The present invention relates to an anti-reflective film for display, and particularly relates to an anti-reflective film with enhanced abrasion resistance and low reflectivity. The present invention further relates to a polarizer with the present anti-reflective film.

BACKGROUND OF THE INVENTION

A display, such as cathode ray tube display (CRT), liquid crystal display (LCD), plasma display (PDP), electroluminescent display (ELD), field emission display (FED), or organic light emitting diode display (OLED), is desired to eliminate the reflection of the external light on the display screen for improving the image quality. An anti-reflective film manufactured by forming a low-refractive layer on a transparent substrate is introduced to improve the reflection of the display screen surface to improve the image quality thereof.

The known anti-reflective film is a low refractive layer disposed on a transparent substrate, and the refractivity of the low refractive layer is lower than that of the transparent substrate. Recently, with the increased requirements for the image quality of the display, the demand for higher quality of the anti-reflective film is also demanded. In order to improve the anti-reflective quality of the anti-reflective film, a low refractive layer with a lower refractivity is required. In the state of the related art, the anti-reflective film with a lower refractivity can be obtained by adding fluorine-containing resins, such as polyurethane oligomers with a fluorine-containing polyether functional group based main-chain and fluorinated polyurethane oligomers, into the low refractive layer, or by increasing the amount of the hollow nanoparticles in the low refractive layer. However, the poor compatibility between the above-mentioned fluorine-containing resins in the low refractive layer will cause non-uniform or opacity appearing on the surface of the anti-reflective film, and less hardness of the above-mentioned fluorine-containing resins will result in the anti-reflective film with insufficient abrasion resistance. Moreover, because of the hydrophobicity of fluorine-containing resins, adding above-mentioned fluorine-containing resins to the low refractive layer results in low adhesion between the anti-reflective film and the release film attached subsequently, which affects the processability of subsequent manufacture process. In addition, increasing the amount of the hollow nanoparticles in the low refractive layer causes the decrease of resin content which contributes to the abrasion resistance of the anti-reflective film be affected.

Since the anti-reflective film is disposed on the surface of the display screen, the hardness and abrasion resistance of the anti-reflection film has to be considered in addition to the requirements of light transmittance and anti-reflection for providing a display with a good image quality. Therefore, an anti-reflective film with low reflectivity, good processability and optical properties, and sufficient abrasion resistance are demanded.

SUMMARY OF THE INVENTION

The present invention is to provide an anti-reflective film comprising a substrate, a hard coating layer coated on the substrate and a low refractive layer on the hard coating layer. The low refractive layer comprises a fluorine-containing acrylate-modified polysiloxane resin, a plurality of hollow silica nanoparticles, an initiator, and a leveling agent comprising a perfluoropolyether group-containing (meth) acrylic-modified organosilicone compound. The reflectivity of the anti-reflective film of present invention is less than 1.1% and preferably less than 1.05%. The water contact angle of the anti-reflective film of present invention is ranging between 90° and 125°, preferably ranging between 95° and 120°.

In an embodiment of the anti-reflective film of the present invention, the fluorine-containing acrylate-modified polysiloxane resin comprises siloxane based main-chain and fluoroalkyl group-containing side-chains and acrylate group-containing side-chains, and the number average molecular weight (Mn) of the fluorine-containing acrylate-modified polysiloxane resin is less than 10,000, the fluorine content is ranging between 1% and 15%, the refractivity is ranging between 1.43 and 1.49 and the fluorine-silicon ratio is ranging between 0.05 and 1.00 thereof.

In another embodiment of the anti-reflective film of the present invention, the low refractive layer may optionally further comprise a fluorinated polyurethane oligomer, wherein the functionality of the fluorinated polyurethane oligomer is between 2 and 6.

In another embodiment of the anti-reflective film of the present invention, the amount of the aforementioned fluorinated polyurethane oligomer is between 25 and 230 parts by weight and preferably between 30 and 185 parts by weight per hundred parts by weight of the fluorine-containing acrylate-modified polysiloxane resin.

In an embodiment of the anti-reflective film of the present invention, the amount of hollow silica nanoparticles in the low refractive layer is ranging from 90 parts to 350 parts by weight and preferably ranging from 100 parts to 300 parts by weight per hundred parts by weight of the a fluorine-containing acrylate-modified polysiloxane resin.

In an embodiment of the anti-reflective film of the present invention, the average particle diameter of the hollow silica nanoparticles used in the low refractive layer is ranging from 50 nm to 100 nm.

In an embodiment of the anti-reflective film of the present invention, the leveling agent used in the low refractive layer is a perfluoropolyether group-containing (meth)acrylic-modified organosilicone compound represented by the following formula (I) or represented by the following formula (II):

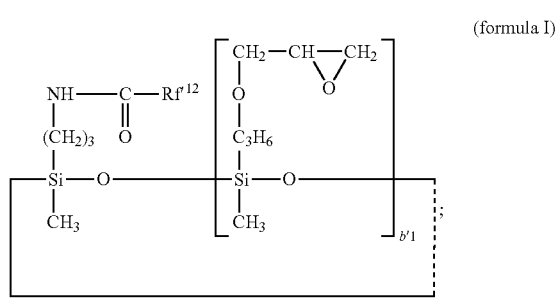

(formula I)

-continued

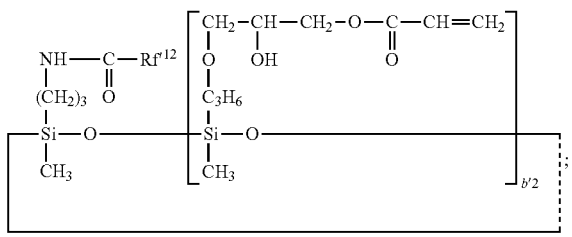

(formula II)

wherein $b'_1+b'_2$ is ranging between 2 and 6.5, and $Rf^{12}$ is represented by the following formula:

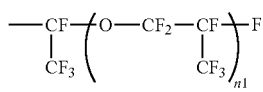

wherein $n_1$ is ranging between 2 and 100.

In an embodiment of the anti-reflective film of the present invention, the number average molecular weight (Mn) of the perfluoropolyether group-containing (meth)acrylic-modified organosilicone compound in the leveling agent is ranging between 1,500 and 16,000.

In an embodiment of the anti-reflective film of the present invention, the amount of the perfluoropolyether group-containing (meth)acrylic-modified organosilicone compound in the low refractive layer is ranging from 2 parts to 30 parts by weight per hundred parts by weight of the polysiloxane resin modified with fluorine and acrylate.

In an embodiment of the anti-reflective film of the present invention, the initiator used in the low refractive layer can be selected from at least one of the group consisting of hydroxycyclohexyl phenyl ketone, dipheny(2,4,6-trimethylbenzoyl) phosphine oxide, 2-hydroxy-2-methyl-1-phenyl-1-propanone, 2-methyl-1-[4-(methylthio)phenyl]-2-morpholinopropan-1-one, oligo[2-hydroxy-2-methyl-1-[4-(1-methylvinyl)penyl]propanone] and 2-hydroxy-1-[4-[4-(2-hydroxy-2-methylpropanoyl)phenoxy]phenyl]-2-methylpropan-1-one, or combinations thereof.

In an embodiment of the anti-reflective film of the present invention, the amount of the initiator used in the low refractive layer is ranging from 1.5 weight parts to 20 weight parts relative to per 100 weight parts of the polysiloxane resin modified with fluorine and acrylate, and preferably ranging from 2 weight parts to 17 weight parts.

In an embodiment of the anti-reflective film of the present invention, the hard coating layer on the substrate can be a hard coating layer or a functional hard coating layer, such as an anti-glare hard coating layer. The hard coating layer comprises a polyurethane (meth)acrylate oligomer and an initiator.

In an embodiment of the anti-reflective film of the present invention, the number molecular weight of the urethane (meth)acrylate oligomer used in the hard coating layer is greater than 1,800, and preferably in the range of 1,800 to 4,500, and the viscosity of the oligomer at 25° C. is greater than 45,000 cps, and preferably ranging from 45,000 cps to 1,300,000 cps.

In an embodiment of the present invention, the hard coating layer is a functional hard coating layer, such as an anti-glare layer. The anti-glare hard coating layer further comprises at least one (meth)acrylate monomers, organic micro-organic particles, silica nanoparticles or and a leveling agent.

A further object of the present invention is to provide a polarizer comprising a polarizing element, wherein the polarizing element of the polarizer comprises an anti-reflective film as above formed thereon.

The above and other aspects of the invention will become better understood with regard to the following detailed description of the preferred but non-limiting embodiment(s). These and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be affected without departing from the spirit and scope of the novel concepts of the disclosure.

DETAILED DESCRIPTION OF THE INVENTION

In the following detailed description, for purposes of explanation, numerous specific details are set forth in order to provide a thorough understanding of the disclosed embodiments. It will be apparent, however, that one or more embodiments may be practiced without these specific details.

It is apparent that departures from specific designs and methods described and shown will suggest themselves to those skilled in the art and may be used without departing from the spirit and scope of the invention. The present invention is not restricted to the particular constructions described and illustrated, but should be construed to cohere with all modifications that may fall within the scope of the appended claims.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art.

The term "(meth)acrylate" used herein refers to acrylate or methacrylate.

The present invention is to provide an anti-reflective film with lower reflectivity and better processability, and proper surface hardness and abrasion resistance. The anti-reflective film of the present invention comprises a substrate, a hard coating layer, and a low refractive layer. The refractivity of the present anti-reflective film is less than 1.1% and preferably less than 1.05%. The water contact angle of the present anti-reflective film is ranging between 90° and 125°, and preferably ranging between 95° and 120°. In comparison with the known anti-reflective film of fluorine-containing resin, because of the decreased water contact angle of the anti-reflective film of the present invention, the adhesion between the anti-reflective film and the release film attached subsequently is increased, which improves the processability of the anti-reflective film.

The substrate suitably used in the anti-reflective film of the present invention can be the film with good mechanical strength and light transmittance. The examples of the substrate can be but not limited to polymethyl methacrylate (PMMA), polyethylene terephthalate (PET), polyethylene naphthalate (PEN), polycarbonate (PC), triacetate cellulose (TAC), polyimide (PI), polyethylene (PE), polypropylene (PP), polyvinyl alcohol (PVA), polyvinyl chloride (PVC) or cyclic olefin copolymer (COC) and the like.

In a preferred embodiment of the present invention, the light transmittance of the substrate is more than 80% and preferably is more than 90%. The thickness of the substrate used in the present anti-reflective film is ranging between 10 µm and 500 µm, and preferably ranging between 15 µm and 250 µm, and more preferably ranging between 20 µm and 100 µm.

In the present invention, the hard coating layer is formed on a substrate. The term "hard coating layer" used herein refers to a hard coating layer with a pencil hardness not less than 2H according to JIS standard K5400. In addition, the thickness of the hard coating layer is, for example, ranging from 0.1 µm to 100 µm, and preferably ranging from 1.0 µm to 10 µm.

The hard coating layer of the present invention is a transparent coating layer. The resin used in the coating layer can be a radiation curable or electron beam curable (meth) acrylate resin, for example but not limited to urethane (meth)acrylate oligomer, polyester (meth)acrylate oligomer, polyurethane(meth)acrylate oligomer, epoxy (meth)acrylate oligomer, melamine (meth)acrylate oligomer, polyfluoroalkyl (meth)acrylate oligomer or silicone (meth)acrylate oligomer and the like. In an embodiment of the present invention, the radiation curable or electron beam curable acrylate resin can be a urethane (meth)acrylate oligomer with a functionality not less than 6 and preferably ranging from 6 to 15, a number average molecular weight not less than 1,800 and preferably ranging from 1,800 to 4,500, and a viscosity at 25° C. of more than 45,000 cps and preferably ranging from 45,000 cps to 1,300,000 cps. If the functionality or the molecular weight of the (meth)acrylate resin used in the hard coating layer is less than above-mentioned, the adhesion between the hard coating layer and substrate of the anti-reflective film will be adversely affected. If the viscosity of the (meth)acrylate resin used in the hard coating layer is too low, the abrasion resistance of the anti-reflective film will be insufficient.

The initiator suitably used in the hard coating layer for the anti-reflective film of the present invention can be selected from those commonly used in the related art, such as, for example, but not limited to, acetophenones, diphenylketones, propiophenones, benzophenones, α-hydroxyketones, fluorenylphosphine oxides and the like. The above-mentioned initiators can be used alone or in combination.

Furthermore, for enhancing curability and hardness, the hard coating layer for the anti-reflective film of the present invention can optionally be added with one or more (meth)acrylate monomers, such as, for example, but not limited to 2-ethylhexyl (meth)acrylate (2-EH(M)A), 2-hydroxyethyl (meth)acrylate (HE(M)A), 2-hydroxypropyl (meth)acrylate, (HP(M)A), 2-hydroxybutyl (meth)acrylate, (HB(M)A), 2-butoxy ethyl (meth)acrylate, 1,6-hexanediol di(meth)acrylate (HDD(M)A), cyclic trimethylolpropane formal (meth) acrylate (CTF(M)A), 2-phenoxyethyl (meth)acrylate, (PHE (M)A), tetrahydrofurfuryl (meth)acrylate (THF(M)A), lauryl (meth)acrylate (L(M)A), diethylene glycol di(meth) acrylate (DEGD(M)A), dipropylene glycol di(meth)acrylate, (DPGD(M)A), tripropylene glycol di(meth)acrylate (TPGD(M)A), pentaerythritol di(meth)acrylate (PED(M)A), dipentaerythritol hexa(meth)acrylate (DPH(M)A), trimethylolpropane tri(meth)acrylate (TMPT(M)A), pentaerythritol tri(meth)acrylate (PET(M)A), isobornyl (meth)acrylate (IBO(M)A), pentaerythritol tetra(meth)acrylate (PETE(M) A), dipentaerythritol penta(meth)acrylate (DPP(M)A), ditrimethylolpropane tetra(meth)acrylate (DTMPTT(M)A) and the like.

The hard coating layer of the present anti-reflective film can optionally be incorporated with a re-coatable fluorine leveling agent, (meth)acrylate leveling agent or organosilicone leveling agent. The leveling agent incorporated into the hard coating layer is used to enhance the surface coverage and smoothness of the coating layer and thus, the surface of the low reflective layer obtained after drying can be a smooth one with antifouling and abrasion resistance. The hard coating layer can be further coated with a low refractive layer.

In further an embodiment of the present invention, the hard coating layer can optionally comprises silica nanoparticles or organic microparticles to form an irregular surface for providing the hard coating layer with an anti-glare property.

In the hard coating layer of the present anti-reflective film, the suitable silica nanoparticles have a primary particle diameter (d50) of 5 nm to 30 nm and a secondary particle diameter (d50) of 50 nm to 120 nm. In an embodiment of the present invention, the amount of the silica nanoparticles used in the hard coating layer is ranging from 0.2 weight percent (wt %) to 12 weight percent (wt %).

In the hard coating layer of the present anti-reflective film, the suitable organic microparticles can be hydrophilic-modified or unmodified organic micoparticles of polymethyl methacrylate, polystyrene, styrene-methyl methacrylate copolymer, polyethylene, epoxy resin, polysilicone, polyvinylidene fluoride or polyvinyl fluoride resin. The particle diameter of the microparticles is less than 5 µm and preferably ranging between 1 µm and 5 µm. In a preferred embodiment of the present invention, for enhancing the dispersion of the organic microparticles in the hard coating layer, the surface of the organic microparticles can be hydrophilic-modified by 2-hydroxyethyl (meth)acrylate (2-HE(M)A) or (meth)acrylonitrile. The preferred hydrophilic-modified organic microparticles can be hydrophilic-modified polymethyl methacrylate, polystyrene, or styrene-methyl methacrylate copolymer microparticles. Furthermore, the amount of the organic microparticles used in the hard coating layer will affect the anti-glare property thereof, the amount of the organic microparticles used in the hard coating layer is ranging from 0.3 weight percent to 12 weight percent.

The refractivity of the low refractive layer of the present anti-reflective film is lower than that of the substrate or the hard coating layer of the present anti-reflective film. The low refractive layer disposed on the hard coating layer comprises a fluorine-containing acrylate-modified polysiloxane resin, a plurality of hollow silica nanoparticles, an initiator and a leveling agent, wherein the leveling agent comprises a perfluoropolyether group-containing (meth)acrylic-modified organosilicone compound.

The fluorine-containing acrylate-modified polysiloxane resin suitable used in the low refractive layer of the anti-reflective film of the present invention comprises a siloxane based main-chain, and fluoroalkyl groups-containing side-chains and acrylate groups-containing side-chains, and the number average molecular weight (Mn) is less than 10,000, the fluorine content is ranging between 1% and 15%, the refractivity is ranging between 1.43 and 1.49 and the fluorine-to-silicon ratio is ranging between 0.05 and 1.00 thereof. The crosslink density can be increased due to the acrylate-containing side-chains of the fluorine-containing acrylate-modified polysiloxane resin to increase the abrasion resistance of the low refractive layer. Moreover, because the fluoroalkyl groups-containing side-chains will reduce the refractivity of the fluorine-containing acrylate-modified polysiloxane resin, a low refractive layer with a lower refractivity can be obtained, and the reflectivity of an incident light at the interface between the low refractive layer and the air can be reduced furtherly. Therefore, the anti-reflective film with a lower reflectivity can provide a better anti-reflection.

In another embodiment of the anti-reflective film of the present invention, the low refractive layer may optionally further comprises a fluorinated polyurethane oligomer. Suitable fluorinated polyurethane oligomers have a functionality of 2 to 6, a number average molecular weight (Mn) of 1,000 to 20,000, a refractivity of 1.30 to 1.45, a viscosity of less than 10,000 cps at 25° C. and fluorine content of 20% to 60%. The incident light reflectivity at the interface between the low refractive layer and the air can be further reduced due to the low refractivity of the added fluorinated polyurethane oligomer, and the crosslink density of the low refractive layer can be increased due to the acryl group in fluorinated polyurethane oligomer, so that the reflectivity of the anti-reflective film can be reduced further while the abrasion resistance is maintained. When the functionality of the fluorinated polyurethane oligomer is less than 2, the crosslink density of the low refractive layer may be insufficient so as to reduce the abrasion resistance of the anti-reflective film. When the functionality of the fluorinated polyurethane oligomer is greater than 6, the shrinkage of the low refractive layer will be too large and result in the adhesion between the low refractive layer and the hard coating layer being affected.

The amount of fluorinated polyurethane oligomer can be ranging from 25 parts to 230 parts by weight and preferably ranging from 30 parts to 185 parts by weight per hundred parts by weight of the fluorine-containing acrylate-modified polysiloxane resin. When the amount of fluorinated polyurethane oligomer is less, the anti-reflectivity of the anti-reflective film cannot be effectively reduced, and when the amount of fluorinated polyurethane oligomer is excess, the non-uniform or opacity on the film surface may occur, which will further affect the optical properties of the anti-reflective film.

The hollow silica nanoparticles in the low refractive layer of the present anti-reflective film is used for enhancing the film strength and lowering the refraction of the low refractive layer. The term "hollow silica nanoparticles" used herein is directed to particle structures with air cavities and/or porous structures. In an embodiment of the present invention, the average primary particle diameter of the hollow silica nanoparticles is ranging between 50 nm and 100 nm, and preferably ranging between 50 nm and 80 nm. The amount of hollow silica nanoparticles is ranging between 90 parts and 350 parts by weight and preferably ranging between 100 parts and 300 parts by weight per hundred parts by weight of the fluorine-containing acrylate-modified polysiloxane resin. The anti-reflectivity of the anti-reflective film cannot be effectively reduced when the amount of hollow silica nanoparticles is less, and when the amount of hollow silica nanoparticles is excess, the abrasion resistance of the anti-reflective film may be reduced.

In an embodiment of the anti-reflective film of the present invention, the leveling agent used in the low refractive layer is a perfluoropolyether group-containing (meth)acrylic-modified organosilicone compound represented by the following formula (I) or a compound represented by the following formula (II):

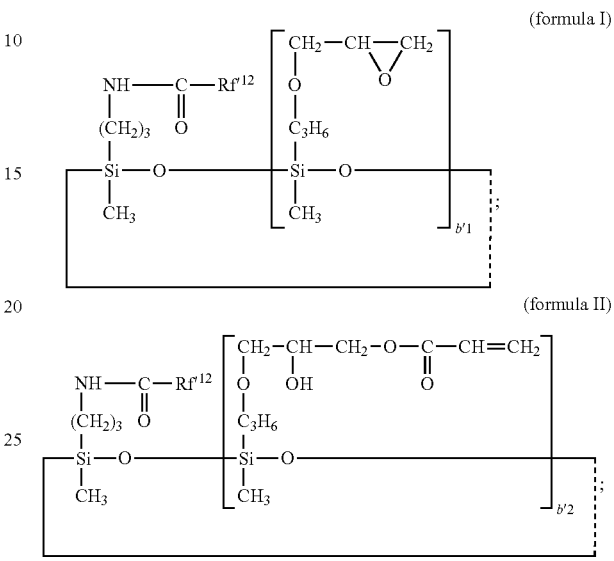

wherein $b'_1 + b'_2$ is ranging between 2 and 6.5, and $Rf^{12}$ is represented by the following formula:

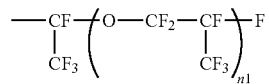

wherein $n_1$ is ranging between 2 and 100.

The perfluoropolyether group-containing (meth)acrylic-modified organosilicone compound is added to the low refractive layer of the anti-reflective film of the present invention as a leveling agent for enhancing the surface coverage and smoothness of the coating layer and thus, further providing a good antifouling and abrasion resistance. Moreover, the addition of the perfluoropolyether group-containing (meth)acrylic-modified organosilicone compound can adjust the compatibility of the fluorine-containing resins, such as the fluorine-containing acrylate-modified polysiloxane resin and fluorinated polyurethane oligomer to avoid the problem of optical properties of the low refractive layer due to the non-uniform or opacity of the surface after curing.

In an embodiment of the anti-reflective film of the present invention, the number average molecular weight of the perfluoropolyether group-containing (meth)acrylic-modified organosilicone compound is ranging between 1,500 and 16,000, and preferably ranging between 3,500 and 7,000. The content of the leveling agent comprising perfluoropolyether group-containing (meth)acrylic-modified organosilicone compound is ranging from 1 part to 45 parts by weight and preferably ranging from 2 parts to 30 parts by weight per hundred parts by weight of the polysiloxane resin modified with fluorine and acrylate. When the amount of the leveling agent comprising perfluoropolyether group-containing (meth)acrylic-modified organosilicone compound is excess or insufficient, the abrasion resistance of the anti-reflective film will be adverse effected.

The initiator suitably used in the low reflective layer of the present invention can be the initiators commonly used in the related art, such as, but not limited to, for example, hydroxycyclohexyl phenyl ketone, dipheny(2,4,6-trimethylbenzoyl) phosphine oxide, 2-hydroxy-2-methyl-1phenylacetone, 2-methyl-1-[4-(methylthio)phenyl]-2-morpholinopropan-1-one, oligo[2-hydroxy-2-methyl-1-[4-(1-methylvinyl)phenyl]propanone] and 2-hydroxy-1-[4-[4-(2-hydroxy-2-methylpropanoyl)phenoxy]phenyl]-2-methylpropan-1-one or combinations thereof. In an embodiment of the present invention, the amount of the initiator in the low refractive layer is between 1.5 parts and 20 parts by weight and preferably between 2 parts and 17 parts by weight per hundred parts by weight of the aforementioned polysiloxane resin modified with fluorine and acrylate. When the content of the initiator is excess or insufficient, the abrasion resistance of the anti-reflective film will be adverse effect.

The preparation of anti-reflective film of the present invention comprises the steps of mixing the urethane(meth) acrylate oligomer, initiator and suitable solvent to make a hard coating solution, wherein the hard coating solution can optionally be added with (meth)acrylate monomers, organic microparticles, silica nanoparticles, or a leveling agent; coating the hard coating solution on a substrate, drying to remove the solvent, and curing by radiation or electron beam to form a hard coating layer on the substrate; mixing a fluoro-contained acrylate-modified polysiloxane resin, hollow silica nanoparticles, an initiator, a leveling agent comprising the perfluoropolyether group-containing (meth) acrylic-modified organosilicone compound and a suitable solvent to obtain a low refractive solution, and a fluorinated polyurethane oligomers with functionality of 2 to 6 can be optionally added to the low refractive solution; and coating the low refractive solution on the hard coating layer, drying to remove the solvent and curing to form a low refractive layer on the hard coating layer by radiation and electron beam.

The solvents suitable for preparation of the present anti-reflective film can be the organic solvents commonly used in the related art, such as ketones, aliphatic, cycloaliphatic or aromatic hydrocarbons, ethers, esters or alcohols. The hard coating solution and the low refractive solution can use one or more organic solvents. The suitable organic solvent can be such as, acetone, butanone, cyclohexanone, methyl isobutyl ketone, hexane, cyclohexane, dichloromethane, dichloroethane, toluene, xylene, propylene glycol methyl ether, methyl acetate, ethyl acetate, propyl acetate, butyl acetate, n-butanol, isobutanol, isopropanol, diacetone alcohol, propylene glycol methyl ether acetate, cyclohexanol or tetrahydrofuran and the likes.

The hard coating solution and the low refractive solution can be applied to the substrate surface by any method known in the related art, for example, bar coating, doctor blade coating, dip coating, roll coating, spinning coating, slot-die coating and the like.

The further aspect of the present invention is to provide a polarizer comprising a polarizing element, wherein the surface of the polarizer comprises an anti-reflective film thereon.

A yet further aspect of the present invention is to provide a display comprising an anti-reflective film and/or a polarizer as above on the surface of the display.

The above and other aspects of the invention will become better understood with regard to the following detailed description of the preferred but non-limiting embodiment(s). These and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be affected without departing from the spirit and scope of the novel concepts of the disclosure.

EXAMPLE

Preparation Example 1: Preparation of Hard Coating Film 405 parts by weight of polyurethane acrylate oligomer (the functionality of 9, the molecular weight is about 2,000, the viscosity at 25° C. is about 86,000 cps, available from Allnex, US), 45 parts by weight of pentaerythritol triacrylate (PETA), 105 parts by weight of dipentaerythritol hexaacrylate (DPHA), 45 parts by weight of hexanediol diacrylate (HDDA), 15 parts by weight of 2-phenoxyethyl acrylate (PHEA), 35 parts by weight of photoinitiator (Chemcure-481, available from Chembridge International Co., Ltd., Taiwan), 5 parts by weight of photoinitiator (TR-PPI-ONE, available from Tronly Enterprise Co., Ltd., Hong Kong), 245 parts by weight of ethyl acetate (EAC) and 100 parts by weight of n-butyl acetate (nBAC) were mixed for 1 hour to form a hard coating solution.

Then, 300 parts of the obtained hard coating solution, 10.8 parts of reactive silica nanoparticle dispersion sol (MEK-AC-4130Y, solid content 30%, solvent: butanone, available from Nissan Chemical Co., Ltd., Japan), 2.55 parts of weight of hydrophobic-modified silica nanoparticles dispersion sol (NanoBYK-3650, solid content 31%, solvent: propylene glycol methyl ether acetate/propylene glycol monomethyl ether, available from BYK, Germany), 15.3 parts of weight of acrylate leveling agent (BYK-UV3535, solid content 10%, solvent: ethyl acetate, available from BYK, Germany), 3.3 parts of weight hydrophilic-modified methyl methacrylate-styrene copolymer microparticles (average particle size 2 μm, refractive index 1.55, available from Sekisui Plastics Co., Ltd., Japan), 108.6 parts of weight of ethyl acetate (EAC) and 141.3 parts by weight of n-butyl acetate (nBAC) were mixed for 1 hour to form. Then, the prepared solution was coated with a thickness of 40 μm on the PMMA substrate, and then the coated substrate was dried in oven at 100° C. for 30 seconds and was cured by UV lamp with a radiation dose of 80 mJ/cm$^2$ under a nitrogen atmosphere. Thus, a hard coating film comprising a hard coating layer with a thickness of 5.2 μm formed on the substrate was obtained.

Preparation Example 2: Preparation of Hard Coating Film 390 parts by weight of polyurethane acrylate oligomer (the functionality of 9, the molecular weight is about 2,000, the viscosity at 25° C. is about 86,000 cps, available from Allnex, US), 45 parts by weight of pentaerythritol triacrylate (PETA), 120 parts by weight of dipentaerythritol hexaacrylate (DPHA), 60 parts by weight of 2-phenoxyethyl acrylate (PHEA), 40 parts by weight of photoinitiator (Chemcure-481), 245 parts by weight of ethyl acetate (EAC) and 100 parts by weight of n-butyl acetate (nBAC) were mixed for 1 hour to form a hard coating solution.

Then, 300 parts of the obtained hard coating solution, 5.44 parts of reactive silica nanoparticle dispersion sol (MEK-5630X, solid content 30%, solvent: butanone, available from Enonik United Silica Industrial Ltd., Taiwan), 2.01 parts of weight of hydrophobic-modified silica nanoparticles dispersion sol (NanoBYK-3650), 15.5 parts of weight of acrylate leveling agent (BYK-UV3535), 3.27 parts of weight hydrophobic-modified methyl methacrylate-styrene copolymer microparticles (average particle size is 2 μm, refractive index 1.55, available from Sekisui Plastics Co., Ltd., Japan), 108.7 parts of weight of ethyl acetate (EAC) and 141.3 parts by weight of n-butyl acetate (nBAC) were mixed for 1 hour to form. Then the prepared solution was coated with a thickness of 40 μm on the PMMA substrate, and then the coated substrate was dried in oven at 100° C. for 120 seconds and was cured by UV lamp with a radiation dose of 80 mJ/cm$^2$ under a nitrogen atmosphere. Thus, a hard coating film comprising a hard coating layer with a thickness of 5.5 μm formed on the substrate was obtained.

Preparation Example 3: Preparation of Hard Coating Film 390 parts by weight of polyurethane acrylate oligomer (the functionality of 9, the molecular weight is about 2,000, the viscosity at 25° C. is about 86,000 cps, available from Allnex, US), 45 parts by weight of pentaerythritol triacrylate (PETA), 120 parts by weight of dipentaerythritol hexaacrylate (DPHA), 60 parts by weight of hexanediol diacrylate (HDDA), 35 parts by weight of photoinitiator (Chemcure-481), 5 parts by weight of photoinitiator (TR-PPI-ONE), 245 parts by weight of ethyl acetate (EAC) and 100 parts by weight of n-butyl acetate (nBAC) were mixed for 1 hour to form hard a coating solution.

Then, 300 parts of the obtained hard coating solution, 5.44 parts of reactive silica nanoparticle dispersion sol (MEK-AC-4130Y), 2.01 parts of weight of hydrophobic-modified silica nanoparticles dispersion sol (NanoBYK-3650), 15.5 parts of weight of acrylate leveling agent (BYK-UV3535), 3.27 parts of weight hydrophilic-modified methyl methacrylate-styrene copolymer microparticles (average particle size 2 μm, refractive index 1.55, available from Sekisui Plastics Co., Ltd., Japan), 108.7 parts of weight of ethyl acetate (EAC) and 141.3 parts by weight of n-butyl acetate (nBAC) were mixed for 1 hour to form. Then the prepared solution was coated with a thickness of 40 μm on the PMMA substrate, and then the coated substrate was dried in oven at 100° C. for 120 seconds and was cured by UV lamp with a radiation dose of 80 mJ/cm$^2$ under a nitrogen atmosphere. Thus, a hard coating film comprising an hard coating layer with a thickness of 6.3 μm formed on the substrate was obtained.

Example 1: Preparation of Anti-Reflective Film 75.4 parts by weight of fluorine-containing acrylate-modified polysiloxane resin (X-12-2430C, available from Shin-Etsu Chemical Co., Ltd., Japan), 5 parts by weight of photoinitiator (KIP-160, available from IGM Resin, Netherlands), 104.9 parts by weight of the mixture of perfluoropolyether group-containing (meth)acryl-modified organosilicone compounds as shown in formula I and formula II (X-71-1203E, solid content 20%, solvent: methyl ethyl ketone, available from Shin-Etsu Chemical Co., Ltd., Japan), 500 parts by weight of hollow silica nanoparticle dispersion sol (Thrulya 4320, solid content 20%, average primary particle size 60 nm, solvent: methyl isobutyl ketone, JGC Catalysts and Chemicals Ltd., Japan) and 6965 parts by weight of ethyl acetate (EAC) were mixed and stirred for 10 minutes to form a low-refraction solution.

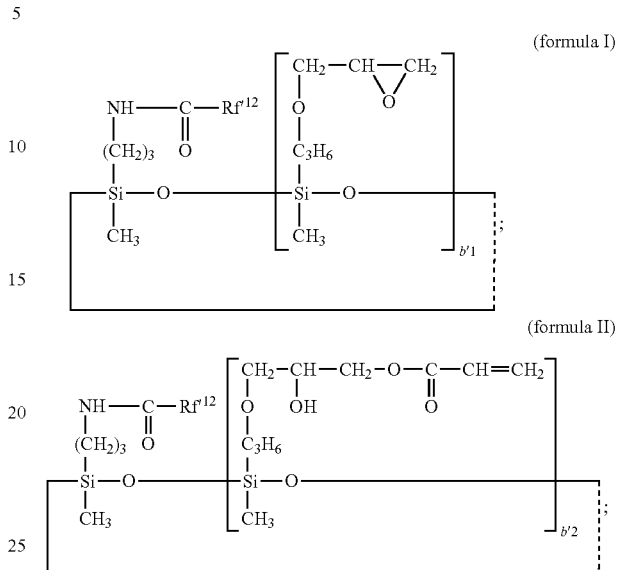

wherein $b'_1+b'_2$ is ranging between 2 and 6.5, and $Rf^{12}$ is represented by the following formula:

$$-CF\!-\!\!\left(\!O\!-\!CF_2\!-\!CF\!\right)\!\!-\!F \atop CF_3 \qquad CF_3 \bigg/_{\!n1}$$

wherein $n_1$ is ranging between 2 and 100.

Then, the low-refraction solution was coated on the hard coating film of Preparation Example 1, and the coated substrate was dried in oven at 80° C. for 2 minutes and was cured by UV lamp with a radiation dose of 350 mJ/cm$^2$ under a nitrogen atmosphere to obtain a low refractive layer with a thickness of about 0.13 μm on the hard coating layer to form an anti-reflective film. The optical properties of the obtained anti-reflective film were determined in accordance with the measurement described hereinafter. The measurement results were shown in Table 1.

Example 2: Preparation of Anti-Reflective Film

An anti-reflective film was prepared in the same manner as in Example 1, except that the amount of the polysiloxane resin (X-12-2430C) was 93.1 parts by weight, the amount of photoinitiator (KIP-160) was 6.2 parts by weight, the amount of the mixture of the (meth)acryl-modified organosilicon compounds (X-71-1203E) was 10.5 parts by weight. The optical properties of the obtained anti-reflective film were determined in accordance with the measurement described hereinafter. The measurement results were shown in Table 1.

Example 3: Preparation of Anti-Reflective Film

An anti-reflective film was prepared in the same manner as in Example 1, except that the amount of the fluorine-containing acrylate-modified polysiloxane resin (X-12-2430C) was 66.5 parts by weight, the amount of the photoinitiator (KIP-160) was 6.3 parts by weight, the amount of the mixture of the perfluoropolyether group-containing (meth)acryl-modified organosilicon compounds (X-71-1203E) was 142.5 parts by weight. The optical properties of the obtained anti-reflective film were determined in accordance with the measurement described hereinafter. The measurement results were shown in Table 1.

Example 4: Preparation of Anti-Reflective Film 63.9 parts by weight of the fluorine-containing acrylate-modified polysiloxane resin (X-12-2430C), 21.3 parts by weight of the fluorinated polyurethane oligomer with the functionality of 6 (LR6000, available from Miwon, Korea), 5.7 parts by weight of photoinitiator (KIP-160), 52.4 parts by weight of the mixture of perfluoropolyether group-containing (meth)acryl-modified organosilicon compounds (X-71-1203E), 500 parts by weight of hollow silica nanoparticle dispersion sol (Thrulya 4320) and 7007 parts by weight of ethyl acetate (EAC) were mixed and stirred for 10 minutes to form a low-refraction solution.

Then, the obtained low-refraction solution was coated on the hard coating film of Preparation Example 2, and then the coated substrate was dried in oven at 80° C. for 2 minutes and was cured by UV lamp with a radiation dose of 350 mJ/cm$^2$ under a nitrogen atmosphere to obtain a low refractive layer with a thickness of about 0.13 μm on the hard coating layer. The specific properties of the obtained anti-reflective film were determined in accordance with the measurement described hereinafter. The measurement results were shown in Table 1.

Example 5: Preparation of Anti-Reflective Film

An anti-reflective film was prepared in the same manner as in Example 4, except that the hard coating film of Preparation Example 3 was used instead of the hard coating film of Preparation Example 2. The specific properties of the obtained anti-reflective film were determined in accordance with the measurement described hereinafter. The measurement results were shown in Table 1.

Example 6: Preparation of Anti-Reflective Film

An anti-reflective film was prepared in the same manner as in Example 4, except that the amount of hollow silica nanoparticle dispersion sol was 350 parts by weight, the amount of ethyl acetate (EAC) was 6098 parts by weight, and the hard coating film of Preparation Example 1 was used instead of the hard coating film of Preparation Example 2. The specific properties of the obtained anti-reflective film were determined in accordance with the measurement described hereinafter. The measurement results were shown in Table 1.

Example 7: Preparation of Anti-Reflective Film

An anti-reflective film was prepared in the same manner as in Example 6, except that the amount of hollow silica nanoparticle dispersion sol was 559 parts by weight, and the amount of ethyl acetate (EAC) was 7497 parts by weigh. The specific properties of the obtained anti-reflective film were determined in accordance with the measurement described hereinafter. The measurement results were shown in Table 1.

Example 8: Preparation of Anti-Reflective Film

An anti-reflective film was prepared in the same manner as in Example 4, except that the hard coating film of Preparation Example 1 was used instead of the hard coating film of Preparation Example 2 and the fluorinated polyurethane oligomer with the functionality of 2 (LR2000, available from Miwon, Korea) was used instead of the fluorinated polyurethane oligomer with the functionality of 6. The specific properties of the obtained anti-reflective film were determined in accordance with the measurement described hereinafter. The measurement results were shown in Table 1.

Example 9: Preparation of Anti-Reflective Film

An anti-reflective film was prepared in the same manner as in Example 6, except that the amount of the fluorine-containing acrylate-modified polysiloxane resin (X-12-2430C) was 42.6 parts by weight and the amount of the fluorinated polyurethane oligomer with the functionality of 6 (LR6000, available from Miwon, Korea) was 42.6 parts by weight. The specific properties of the obtained anti-reflective film were determined in accordance with the measurement described hereinafter. The measurement results were shown in Table 1.

Comparative Example 1: Preparation of Anti-Reflective Film

An anti-reflective film was prepared in the same manner as in Example 1, except that the fluorinated polyurethane oligomer with the functionality of 2 (LR2000) was used instead of the fluorine-containing acrylate-modified polysiloxane resin(X-12-2430C). The specific properties of the obtained anti-reflective film were determined in accordance with the measurement described hereinafter. The measurement results were shown in Table 1.

Optical Property Measurement

The optical properties of the anti-reflective films obtained from the Examples and Comparative Example were measured according to JIS test methods, wherein the Haze was measured according to the test method of JIS K7136 by NDH-2000 Haze Meter (manufactured by Nippon Denshoku Industries, Japan), and the light transmittance was measured according to the test method of JIS K7361 by NDH-2000 Haze Meter (manufactured by Nippon Denshoku Industries, Japan).

Reflectivity Measurement

The Reflectivities of the anti-reflective films obtained from the Examples and Comparative Example were measured obtained by adhering the anti-reflective films to a black plate and measuring the average reflectivity thereof by Hitachi U-4100 spectrometer at a wavelengths of from 380 to 780 nm.

Surface Uniformity Evaluation

The anti-reflective films obtained from the Examples and Comparative Example were adhered to a black acrylic plate, and checked by visual observation if there was any spots or dots resulted from the uneven thickness on the film surface. If there was no spots or dots on the surface, it was marked as "○"; if there were spots or dots on the surface, it was marked as "x".

Film Appearance Evaluation

The anti-reflective films obtained from the Examples and Comparative Example were adhered to a black acrylic plate, and the appearances of the films were checked by visual observation. If the film was opaque, it was marked as "x"; If the film was transparent on the surface, it was marked as "○".

Water Contact Angel Measurement

The anti-reflective films obtained from the Examples and Comparative Example were adhered to the sample stage and measured by the Phoenix-150 contact angle analyzer (available from Surface Electro Optics, Korea) to obtain the water contact angles.

Abrasion Resistance Test

The surfaces of the anti-reflective films obtained from the Examples and Comparative Example were rubbed by steel wood #0000 with a load of 500 g/cm$^2$ and 750 g/cm$^2$ for 10 times to check if scratches were made on the film surface by observation. The evaluation criteria were as below.

◎: No scratched
○: 1-4 scratches were made
Δ: 5-14 scratches were made
x: Above 15 scratches were made
x x: The entire surface layer was scratched off.

TABLE 1

The test results of the anti-reflective films obtained from Examples and Comparative Example

|  | Haze (%) | Light transmittance (%) | Minimum reflectivity (%) | Average reflectivity (%) | Water contact angel (°) | Uniformity of film surface | Appearance of film | Abrasion resistance (500 g/cm$^2$) | Abrasion resistance (750 g/cm$^2$) |
|---|---|---|---|---|---|---|---|---|---|
| Example 1 | 3.03 | 94.94 | 0.90 | 0.96 | 109.5 | ○ | ○ | ◎ | ◎ |
| Example 2 | 3.19 | 94.75 | 0.99 | 1.05 | 97.5 | ○ | ○ | ◎ | ○ |
| Example 3 | 3.19 | 94.97 | 0.79 | 0.86 | 106.7 | ○ | ○ | ◎ | ○ |
| Example 4 | 2.01 | 94.63 | 0.78 | 0.83 | 115.6 | ○ | ○ | ◎ | ◎ |
| Example 5 | 1.98 | 94.51 | 0.86 | 0.91 | 115.3 | ○ | ○ | ◎ | ◎ |
| Example 6 | 3.18 | 94.82 | 0.96 | 1.05 | 108.2 | ○ | ○ | ◎ | ◎ |
| Example 7 | 3.31 | 95.11 | 0.72 | 0.77 | 120.7 | ○ | ○ | ◎ | ◎ |
| Example 8 | 3.19 | 94.94 | 0.84 | 0.88 | 111.7 | ○ | ○ | ◎ | ○ |
| Example 9 | 3.76 | 94.85 | 0.53 | 0.58 | 121.8 | ○ | ○ | ◎ | Δ |
| Comparative Example 1 | 3.33 | 95.36 | 0.41 | 0.47 | 131.9 | ○ | ○ | X X | X X |

As shown in Table 1, compared to anti-reflective film of the Comparative Example, all of the anti-reflective films of Examples 1 to 9 exist lower reflectivities, good surface appearances and uniformities, and good optical properties such as appropriate haze and high light transmittance, while still maintaining proper abrasion resistance. The anti-reflective films of Examples 1, 4 and 7 passed the abrasion resistance test with a load of 750 g/cm$^2$ without any scratches on the surfaces thereof. In addition, the water contact angles of the anti-reflective films of Examples 1 to 9 were between 90° and 125°. The water contact angles of the anti-reflective films of Example 1, 2, 3, and 6 was less than 110°, and the water contact angle of Example 2 was less than 98°. A smaller water contact angle provides a higher adhesion between the anti-reflective film and the release film attached subsequently, which improves the processability of the anti-reflective film.

Although particular embodiments have been shown and described, it should be understood that the above discussion is not intended to limit the present invention to these embodiments. Persons skilled in the art will understand that various changes and modifications may be made without departing from the scope of the present invention as literally and equivalently covered by the following claims.

What is claimed is:

1. A anti-reflective film, comprising:
a substrate;
a hard coating layer formed on a surface of the substrate; and
a low refractive layer formed on the hard coating layer, wherein the low refractive layer comprising:
a fluorine-containing acrylate-modified polysiloxane resin, wherein the fluorine-containing acrylate-modified polysiloxane resin comprises a siloxane based main-chain, fluoroalkyl group-containing side-chains and acrylate group-containing side-chains, and the number average molecular weight (Mn) of the fluorine-containing acrylate-modified polysiloxane resin is less than 10,000, the fluorine weight content thereof is ranging between 1% and 15%, the refractivity thereof is ranging between 1.43 and 1.49 and the fluorine-to-silicon ratio thereof is ranging between 0.05 and 1.00;
a plurality of hollow silica nanoparticles;
an initiator; and
a leveling agent comprising a perfluoropolyether group-containing (meth)acrylic-modified organosilicone compound;
wherein the reflectivity of the anti-reflective film is less than 1.1% measured at a wavelength ranging between 380 nm and 780 nm, and the water contact angle of the anti-reflective film is ranging between 90° and 125°.

2. The anti-reflective film as claimed in claim 1, wherein the amount of hollow silica nanoparticles in the low refractive layer is ranging from 90 parts to 350 parts by weight per hundred parts by weight of the fluorine-containing acrylate-modified polysiloxane resin.

3. The anti-reflective film as claimed in claim 1, wherein the average primary particle diameter of the hollow silica nanoparticles is ranging from 50 nm to 100 nm.

4. The anti-reflective film as claimed in claim 1, the leveling agent is a perfluoropolyether group-containing (meth)acrylic-modified organosilicone compound represented by the following formula (I) or represented by the following formula (II):

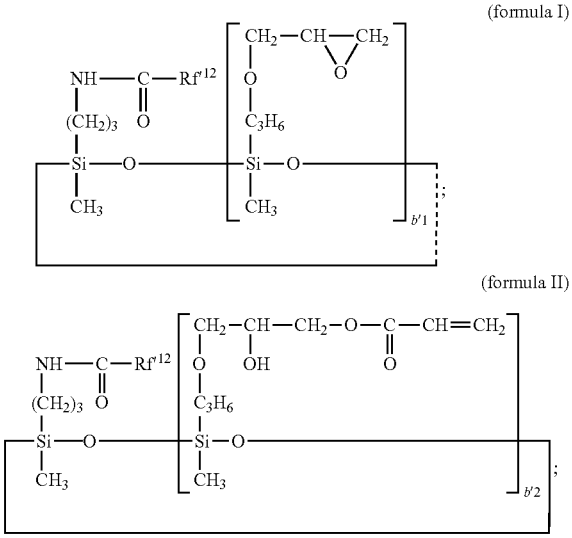

(formula I)

(formula II)

wherein $b'_1 + b'_2$ is ranging between 2 and 6.5, and $Rf'^{12}$ is represented by the following formula:

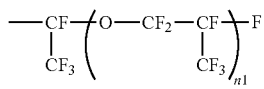

wherein n1 is ranging between 2 and 100.

5. The anti-reflective film as claimed in claim 4, wherein the number average molecular weight (Mn) of the perfluoropolyether group-containing (meth)acrylic-modified organosilicone compound is ranging between 1,500 and 16,000.

6. The anti-reflective film as claimed in claim 1, wherein the content of the leveling agent is ranging from 1 part to 45 parts by weight per hundred parts by weight of the fluorine-containing acrylate-modified polysiloxane resin.

7. The anti-reflective film as claimed in claim 1, wherein the low refractive layer further comprises a fluorinated polyurethane oligomer, and the functionality of the fluorinated polyurethane oligomer is between 2 and 6.

8. The anti-reflective film as claimed in claim 7, wherein the amount of fluorinated polyurethane oligomer is ranging from 25 parts to 230 parts by weight per hundred parts by weight of the fluorine-containing acrylate-modified polysiloxane.

9. The anti-reflective film as claimed in claim 1, wherein the amount of the initiator is between 1.5 parts and 20 parts by weight per hundred parts by weight of the fluorine-containing acrylate-modified polysiloxane resin.

10. The anti-reflective film as claimed in claim 1, wherein the initiator is at least one selected from the group consisting of hydroxycyclohexyl phenyl ketone, dipheny(2,4,6-trimethylbenzoyl) phosphine oxide, 2-hydroxy-2-methyl-1phenylacetone, 2-methyl-1-[4-(methylthio)phenyl]-2-morpholinopropan-1-one, oligo[2-hydroxy-2-methyl-1-[4-(1-methylvinyl)phenyl]propanone] and 2-hydroxy-1-[4-[4-(2-hydroxy-2-methylpropanoyl)phenoxy]phenyl]-2-methylpropan-1-one or combinations thereof.

11. The anti-reflective film as claimed in claim 1, wherein the hard coating layer formed on the surface of the substrate comprises a polyurethane (meth)acrylate oligomer and an initiator.

12. The anti-reflective film as claimed in claim 11, wherein the hard coating layer formed on the surface of the substrate further comprises at least one (meth)acrylate monomer, a plurality of organic microparticles, a plurality of silica nanoparticles or a leveling agent.

13. A polarizer comprising a polarizing element, wherein an anti-reflective film as claimed in claim 1 is formed on a surface of the polarizing element of the polarizer.

* * * * *